US010120206B2

(12) United States Patent
Tanaka et al.

(10) Patent No.: US 10,120,206 B2
(45) Date of Patent: Nov. 6, 2018

(54) OPTICAL FILM AND OPTICAL LAMINATE USING SAME

(71) Applicants: NIPPON KAYAKU KABUSHIKI KAISHA, Tokyo (JP); MITSUBISHI GAS CHEMICAL COMPANY, INC., Tokyo (JP); MGC FILSHEET CO., LTD., Saitama (JP)

(72) Inventors: Kouichi Tanaka, Tokyo (JP); Yoshiyuki Yahagi, Saitama (JP); Hideyoshi Fujisawa, Tokyo (JP); Takuya Gotou, Ibaraki (JP); Katsuyuki Murai, Kanagawa (JP); Kazuhisa Mitsuhata, Tokyo (JP); Kyousuke Nakamura, Saitama (JP)

(73) Assignees: NIPPON KAYAKU KABUSHIKI KAISHA, Tokyo (JP); MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 0 days.

(21) Appl. No.: 15/321,473

(22) PCT Filed: Jun. 23, 2015

(86) PCT No.: PCT/JP2015/068003
§ 371 (c)(1),
(2) Date: Dec. 22, 2016

(87) PCT Pub. No.: WO2016/002582
PCT Pub. Date: Jan. 7, 2016

(65) Prior Publication Data
US 2017/0160566 A1    Jun. 8, 2017

(30) Foreign Application Priority Data

Jul. 1, 2014    (JP) .................................. 2014-136243

(51) Int. Cl.
*G02B 5/30*    (2006.01)
*G02C 7/12*    (2006.01)
(Continued)

(52) U.S. Cl.
CPC ................. *G02C 7/12* (2013.01); *G02B 5/30* (2013.01); *G02B 5/3016* (2013.01);
(Continued)

(58) Field of Classification Search
CPC .......... G02C 7/10; G02C 7/104; G02C 7/105; G02C 7/108; G02C 7/12; G02B 5/3016;
(Continued)

(56) References Cited

U.S. PATENT DOCUMENTS 5,082,354 A    1/1992    Kalmanash et al.
5,827,449 A    10/1998    Hanelt et al.
(Continued)

FOREIGN PATENT DOCUMENTS

EP    0415735    3/1991
EP    2677352    12/2013
(Continued)

OTHER PUBLICATIONS

International Search Report issued in Patent Application No. PCT/JP2015/068003, dated Sep. 29, 2015.
(Continued)

*Primary Examiner* — William R Alexander
(74) *Attorney, Agent, or Firm* — Greenblum & Bernstein, P.L.C.

(57) ABSTRACT

[Problem] The present invention provides eyewear, such as polarized sunglasses, having cholesteric liquid crystal layers, wherein the eyewear has a metallic tone and antiglare properties, minimizes the reduction in light-polarizing element absorptive capability that is associated with circular
(Continued)

polarization, and is moreover unaffected by external degrading factors such as sebum, moisture, and salt air.

[Solution] This optical film is characterized by being provided with a light-reflecting layer R comprising a cholesteric liquid crystal layer that has right-handed helical orientation, a light-reflecting layer L comprising a cholesteric liquid crystal layer that has left-handed helical orientation, and a polarizing element layer.

13 Claims, 1 Drawing Sheet

(51) Int. Cl.
*G02B 27/28* (2006.01)
*G02C 7/10* (2006.01)
(52) U.S. Cl.
CPC ......... *G02B 5/3041* (2013.01); *G02B 27/288* (2013.01); *G02C 7/108* (2013.01)
(58) Field of Classification Search
CPC .... G02B 5/3041; G02B 27/288; G02B 27/28; G02B 5/30
USPC .......................................... 351/159.56, 159.01
See application file for complete search history.

(56) References Cited

U.S. PATENT DOCUMENTS

| | | | | |
|---|---|---|---|---|
| 6,094,242 A * | 7/2000 | Yamanaka | ............ | G02B 5/3016 349/115 |
| 6,995,825 B2 | 2/2006 | Graham et al. | | |
| 7,148,946 B2 | 12/2006 | Yano et al. | | |
| 7,401,817 B2 * | 7/2008 | Muller-Rees | ............ | B41M 3/14 252/587 |
| 7,446,848 B2 * | 11/2008 | Takeda | ................ | G02F 1/13362 349/194 |
| 7,671,949 B2 | 3/2010 | Sasaki et al. | | |
| 8,368,857 B2 * | 2/2013 | Kuo | .................... | G02B 5/3016 349/115 |
| 2002/0113921 A1 * | 8/2002 | Jiang | .................... | B82Y 15/00 349/96 |
| 2002/0186474 A1 | 12/2002 | Weber et al. | | |
| 2003/0085380 A1 * | 5/2003 | Schuhmacher | ..... | C09B 67/0098 252/299.7 |
| 2003/0090012 A1 * | 5/2003 | Allen | .................... | G02B 5/3016 264/1.31 |
| 2004/0252259 A1 | 12/2004 | Schadt et al. | | |
| 2006/0181662 A1 * | 8/2006 | Kameyama | ....... | G02F 1/133528 349/117 |
| 2007/0052886 A1 * | 3/2007 | Fan | ......................... | G02C 7/04 349/98 |
| 2010/0149618 A1 * | 6/2010 | Sprague | ............ | G02B 27/0172 359/259 |
| 2016/0349573 A1 * | 12/2016 | Ohmuro | ................ | G02F 1/1336 |
| 2017/0010398 A1 * | 1/2017 | Ishikawa | .............. | C09K 19/586 |

FOREIGN PATENT DOCUMENTS

| | | |
|---|---|---|
| JP | 2001-180200 | 7/2001 |
| JP | 2002-90535 | 3/2002 |
| JP | 2002-182212 | 6/2002 |
| JP | 2003-294948 | 10/2003 |
| JP | 2003-307620 | 10/2003 |
| JP | 2003-315556 | 11/2003 |
| JP | 2004-29824 | 1/2004 |
| JP | 2004-507781 | 3/2004 |
| JP | 2008-242466 | 10/2008 |

OTHER PUBLICATIONS

Extended European Search Report from Application No. 15815846.9 dated Mar. 19, 2018.

* cited by examiner

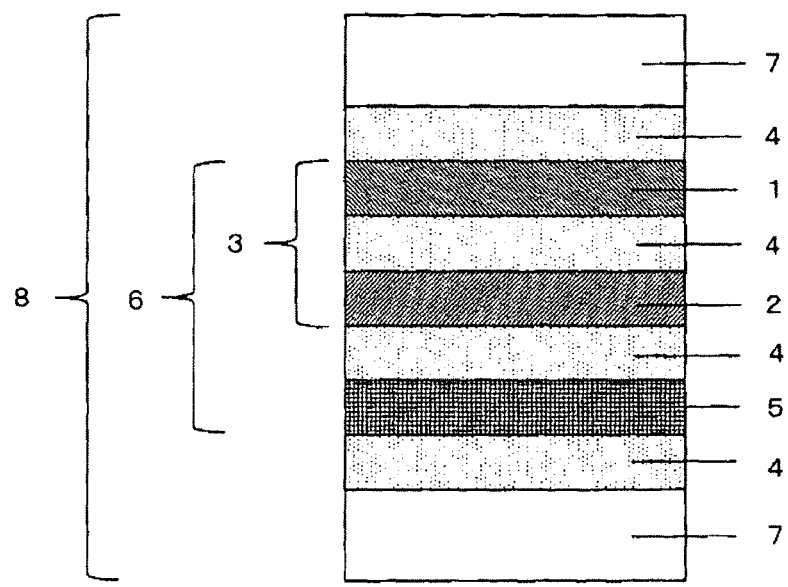

OPTICAL FILM AND OPTICAL LAMINATE USING SAME

TECHNICAL FIELD

The present invention relates to an optical film provided with a light-reflecting layer for reflecting visible light, and a polarizing element, and primarily intended for utilization in eyewear (sunglasses, goggles, helmet visors, and the like).

BACKGROUND ART

Eyewear (sunglasses, goggles, visors, and the like) is employed for reducing glare caused by reflected light from water, road surfaces, snow, and the like. For example, with sunglasses, the lens parts are tinted with pigments or the like so as to reduce the amount of light entering the eyes and reduce glare, through absorption of light by the pigment. Polarized sunglasses are particularly effective against reflected light from water, snow, and the like.

Because reflected light is polarized light, polarized sunglasses are designed to effectively absorb light in the polarization direction thereof, so that glare can be reduced and visibility improved without significantly reducing the amount of light entering the eye.

Polarized sunglasses, which typically have polarizing elements sandwiched by supports of polycarbonate or the like, can be obtained by machining these to the desired shape and fitting them into a frame. The polarizing elements are typically films in which dichromatic dyes, or "dichromatic pigments," which are polyvalent iodine-polyvinyl alcohol (PVA) complexes, are uniaxially oriented together with polymers such as PVA. Depending on the color of the pigments used, polarizing elements of various colors can be obtained, but normal sunglasses are often tinted gray in order to impart polarizing properties throughout the entire visible light spectrum.

In some cases, multilayer films are vapor-deposited onto surfaces of polarized sunglasses in order to impart design qualities, or further improve visibility. By imparting a multilayer film, reflected light from the sunglass surface can be made to appear to others to have a metallic-tone hue of blue, green, or red, while by reflecting specific light, from the wearer's perspective, glare is reduced, and the visibility of the landscape is further improved. While imparting a multilayer film in this manner is advantageous for the wearer, a problem in terms of handling, specifically, that sebum or the like adhering to a multilayer film is difficult to remove, or a problem of peeling of the multilayer film in locations of exposure to moisture such as seawater or to salt air, was sometimes encountered.

To address this problem, methods such as placing the multilayer film on the inside of the support, i.e., between the polarizing element and the support, have been considered. However, because the reflecting abilities of a multilayer film are produced by differences in refractive index between the layers, it is difficult to obtain reflecting abilities comparable to an interface with the outside air. Moreover, because multilayer films comprise inorganic substances, adhesion to polarizing elements, which are organic, can be a problem.

There are other methods in which, rather than employing a multilayer film, a cholesteric liquid crystal layer is employed as a method for imparting a metallic hue using an organic substance, such as that disclosed in Patent Document 1 (Japanese Laid-Open Patent Application 2001-180200). In cholesteric liquid crystals, the liquid crystal molecules exist in a helically oriented state, and depending on the length of the helical pitch, have the ability to selectively reflect polarized light components having the same direction as the direction of the helix within a specific wavelength band. An optical laminate that employs a cholesteric liquid crystal layer with a fixed helical orientation producing a desired reflection wavelength band will have a vivid hue, and can impart ornamental qualities.

PRIOR ART DOCUMENTS

Patent Documents

Patent Document 1: Japanese Laid-Open Patent Application 2001-180200
Patent Document 2: Japanese Laid-Open Patent Application 2003-315556
Patent Document 3: Japanese Laid-Open Patent Application 2004-29824

Due to these qualities, cholesteric liquid crystals can reflect circular-polarized components within specific wavelength bands. Further, right-handed and left-handed orientations for helical orientation exist, and in the case of a right-handed helical orientation, it is possible for only the right-handed circular-polarized component to be reflected, or in the case of a left-handed helical orientation, it is possible for only the left-handed circular-polarized component to be reflected. Consequently, in the case of a right-handed helical orientation, when outside light enters, only the right-handed circular-polarized component of the wavelength region corresponding to the helical pitch is reflected, and the left-handed circular-polarized component of the corresponding wavelength region is transmitted. Theoretically, the respective reflectance and the transmittance are each 50%.

While metallic hues can be imparted without the use of a multilayer film through the use of cholesteric liquid crystal layers in the aforedescribed manner, transmitted light in the reflection wavelength region is fundamentally circularly polarized light, and therefore when such a layer is combined with a polarizing element, the polarizing element is not able to absorb transmitted light to a sufficient extent, giving rise to a new problem of an increase in leaking light from the polarizing element, and loss of inherent functionality as polarized sunglasses. According to Patent Document 1, the cholesteric liquid crystal layer employs only a single layer of right-handed helical orientation, and to date, there has been no effective means for solving the aforedescribed problem of reduced polarization.

SUMMARY OF THE INVENTION

Problems to be Solved by the Invention

It is an object of the present invention to provide eyewear, such as polarized sunglasses or the like, having a cholesteric liquid crystal layer, wherein the eyewear has a metallic hue and anti-glare properties, minimizes the decline in light-absorbing capability of polarizing elements which is associated with polarized light, and moreover is unaffected by the extrinsic degrading factors of sebum, moisture, and salt air.

Means Used to Solve the Above-Mentioned Problems

As a result of painstaking research conducted in order to solve this problem, the inventors made the novel discovery that by employing a laminate of a light-reflecting layer R comprising a cholesteric liquid crystal layer having a right-handed helical orientation and a light-reflecting layer L comprising a cholesteric liquid crystal layer having a left-handed helical orientation, and laminating this to a polarizing element to produce an optical film for sandwiching between supports for use as polarized sunglasses, there may be obtained polarized sunglasses of excellent performance and quality, and which are unaffected by extrinsic degrading factors, and experience no loss of the inherent functionality of polarized sunglasses, leading to the present invention.

Specifically, the present invention relates to:

(1) an optical film, characterized by comprising:
a light-reflecting layer R comprising a cholesteric liquid crystal layer having a right-handed helical orientation,
a light-reflecting layer L comprising a cholesteric liquid crystal layer having a left-handed helical orientation, and
a polarizing element layer;

(2) the optical film according to (1), characterized in that difference of the center reflection wavelength between the light-reflecting layer R and the light-reflecting layer L is within 20 nm;

(3) the optical film according to (1) or (2), characterized in that the light-reflecting layer R is obtained by fixing the cholesteric liquid crystal layer having a right-handed helical orientation and that the light-reflecting layer L is obtained by fixing the cholesteric liquid crystal layer having a left-handed helical orientation;

(4) the optical film according to any of (1) to (3), characterized in that the center reflection wavelengths of the light-reflecting layer R and the light-reflecting layer L are 400 nm-800 nm;

(5) the optical film according to any of (1) to (4), characterized in that the polarizing element comprises a stretched polymer film containing a dichroic pigment;

(6) an optical laminate, characterized in that a light-reflecting layer R comprising a cholesteric liquid crystal layer having a right-handed helical orientation, a light-reflecting layer L comprising a cholesteric liquid crystal layer having a left-handed helical orientation, and a polarizing element layer are provided between a first support and a second support;

(7) the optical laminate according to (6), characterized in that difference of the center reflection wavelength between the light-reflecting layer R and the light-reflecting layer L is within 20 nm;

(8) the optical laminate according to (6) or (7), characterized in that the light-reflecting layer R is obtained by fixing the cholesteric liquid crystal layer having a right-handed helical orientation and that the light-reflecting layer L is obtained by fixing the cholesteric crystal layer having a left-handed helical orientation;

(9) the optical laminate according to any of (6) to (8), characterized in that the center reflection wavelengths of the light-reflecting layer R and the light-reflecting layer L are 400 nm-800 nm;

(10) the optical laminate according to any of (6) to (9), characterized in that the polarizing element comprises a stretched polymer film containing a dichroic pigment;

(11) the optical laminate according to any of (6) to (10), characterized in that the supports are polycarbonate; and

(12) eyewear comprising the optical film according to any of (1) to (5) or the optical laminate according to any of (6) to (11).

Effect of the Invention

By employing the optical film of the present invention, lowered polarity of a polarizing element due to circularly polarized light can be minimized. Moreover, polarized sunglasses obtained using the optical film of the present invention are not directly affected by the extrinsic degrading factors of sebum, moisture, and salt air, and therefore a metallic hue can be maintained consistently for an prolonged period.

BRIEF DESCRIPTION OF THE DRAWINGS

FIG. 1 is a descriptive diagram showing the laminate according to the present invention.

EMBODIMENTS FOR CARRYING OUT THE INVENTION

The cholesteric liquid crystals employed in the present invention comprise nematic liquid crystals having chirality, or a mixture of nematic liquid crystals to which a chiral agent has been added. Because the orientation of the helix and the reflection wavelength can be designed freely through selection of the type and amount of the chiral agent, a method of obtaining cholesteric liquid crystals by adding a chiral agent to nematic liquid crystals is preferred. The nematic liquid crystals used in the present invention differ from liquid crystals that are manipulated by an electrical field, in that the liquid crystals herein are used in a fixed state, and therefore it is preferable to employ a nematic liquid crystal monomer having polymerizable groups.

Nematic liquid crystal monomers having polymerizable groups are compounds that contain polymerizable groups in their molecules, and exhibit liquid crystal properties in given temperature ranges or concentration ranges. As polymerizable groups, there may be cited, for example, (meth)acryloyl groups, vinyl groups, chalconyl groups, cinnamoyl groups, epoxy groups, and the like. In terms of exhibiting liquid crystal properties, it is preferable for the molecule to contain a mesogen group; a mesogen group refers, for example, to rod-shaped or plate-shaped substituent group such as a biphenyl group, a terphenyl group, a (poly)benzoic acid phenyl ester group, a (poly)ether group, a benzylideneaniline group, an acenaphthoquinoxaline group, or the like, or to a disk-shaped substituent group such as a triphenylene group, a phthalocyanine group, an aza crown group, or the like, i.e., a group having the ability to induce liquid crystal phase behavior. Liquid crystal compounds having rod-shaped or plate-shaped groups are known as calamitic liquid crystals in the technical field in question.

As specific examples of nematic liquid crystals having such polymerizable groups, there may be cited the polymerizable liquid crystals disclosed in Patent Document 2 or Patent Document 3, the PALICOLOR series (manufactured by BASF), the RMM series (manufactured by Merck), and the like. These nematic liquid crystal monomers having polymerizable groups may be employed individually, or in mixtures of several.

The chiral agent is preferably a compound able to orient the aforementioned nematic liquid crystal monomers having polymerizable groups to produce either a right-handed or left-handed helical orientation, and having polymerizable groups comparable to those of the nematic liquid crystal monomers having polymerizable groups. As such chiral agents, there may be cited, for example, Palicolor LC756 (manufactured by BASF), compounds having the optically active binapthyl structures disclosed in Japanese Laid-open Patent Application No. 2002-179668 or Japanese Laid-open Patent Application No. 2007-271808, compounds having the optically active isosorbide structures disclosed in Japanese Laid-open Patent Application No. 2003-306491 or Japanese Laid-open Patent Application No. 2003-313292, and the like. The added amount of the chiral agent will differ depending on the type of chiral agent and the wavelength to be reflected, but is preferably about 0.5 wt %-30 wt %, and more preferably about 1 wt %-20 wt %, with respect to the nematic liquid crystal monomer having polymerizable groups.

It is moreover possible to add polymerizable compounds that lack liquid crystal properties, but are reactable with nematic liquid crystal monomers having polymerizable groups. As such compounds, there may be cited, for example, ultraviolet curable resins. As ultraviolet curable resins, there may be cited, for example, dipentaerythritol hexa(meth)acrylate, a reaction product of dipentaerythritol penta(meth)acrylate and 1,6-hexamethylene diisocyanate, a reaction product of a triisocyanate having an isocyanuric ring and pentaerythritol tri(meth)acrylate, a reaction product of pentaerythritol tri(meth)acrylate and isophorone diisocyanate, dipentaerythritol penta(meth)acrylate, dipentaerythritol tetra(meth)acrylate, pentaerythritol tetra(meth)acrylate, pentaerythritol tri(meth)acrylate, trimethylolpropane tri(meth)acrylate, ditrimethylolpropane tetra(meth)acrylate, tris(acryloxyethyl)isocyanurate, tris(methacryloxyethyl)isocyanurate, a reaction product of glycerol triglycidyl ether and (meth)acrylic acid, caprolactone-modified tris(acryloxyethyl)isocyanurate, a reaction product of trimethylolpropane triglycidyl ether and (meth)acrylic acid, triglycerol-di-(meth)acrylate, a reaction product of propylene glycol diglycidyl ether and (meth)acrylic acid, poly(propylene glycol)-di-(meth)acrylate, tripropylene glycol-di-(meth)acrylate, poly(ethylene glycol)-di-(meth)acrylate, tetraethylene glycol-di-(meth)acrylate, triethylene glycol-di-(meth)acrylate, pentaerythritol-di-(meth)acrylate, a reaction product of 1,6-hexanediol-di-glycidyl ether and (meth)acrylic acid, 1,6-hexanediol-di-(meth)acrylate, glycerol-di-(meth)acrylate, a reaction product of ethylene glycol-di-glycidyl ether and (meth)acrylic acid, a reaction product of diethylene glycol-di-glycidyl ether and (meth)acrylic acid, bis(acryloxyethyl) hydroxyethyl isocyanurate, bis(methacryloxyethyl)hydroxyethyl isocyanurate, a reaction product of bisphenol A-di-glycidyl ether and (meth)acrylic acid, tetrahydrofurfuryl(meth)acrylate, caprolactone-modified tetrahydrofurfuryl (meth)acrylate, 2-hydroxyethyl (meth)acrylate, 2-hydroxypropyl(meth)acrylate, poly(propylene glycol) (meth)acrylate, poly(ethylene glycol) (meth)acrylate, phenoxyhydroxypropyl(meth)acrylate, acryloyl morpholine, methoxy polyethylene glycol (meth)acrylate, methoxy tetraethylene glycol (meth)acrylate, methoxy triethylene glycol (meth)acrylate, methoxy ethylene glycol (meth)acrylate, methoxyethyl(meth)acrylate, glycidyl(meth)acrylate, glycerol (meth)acrylate, ethyl carbitol (meth)acrylate, 2-ethoxyethyl(meth)acrylate, N,N-dimethylaminoethyl (meth)acrylate, 2-cyanoethyl (meth)acrylate, a reaction product of butyl glycidyl ether and (meth)acrylic acid, butoxy triethylene glycol (meth)acrylate, butanediol mono(meth)acrylate, and the like; these compounds may be used alone or in combinations of two or more. These ultraviolet curable resins lacking liquid crystal properties must be added at levels such that there is no loss of liquid crystal properties, preferably in amounts of 0.1-20 wt %, and more preferably about 1.0-10 wt %, with respect to the nematic liquid crystal monomer having polymerizable groups.

In cases in which the nematic liquid crystal monomer having polymerizable groups, and/or other polymerizable compounds employed in the present invention are of ultraviolet curable type, a photopolymerization initiator is added in order to bring about curing of the composition. As photopolymerization initiators, there may be cited, for example, acetophenone compounds such as 2-methyl-1-[4-(methylthio)phenyl]-2-morpholinopropane-1-on ("IRGACURE 907" manufactured by BASF), 1-hydroxycyclohexylphenyl ketone ("IRGACURE 184" manufactured by BASF), 4-(2-hydroxyethoxy)-phenyl-(2-hydroxy-2-propyl) ketone ("IRGACURE 2959" manufactured by BASF), 1-(4-dodecylphenyl)-2-hydroxy-2-methylpropane-1-on ("DAROCUR 953" manufactured by Merck), 1-(4-isopropylphenyl)-2-hydroxy-2-methylpropane-1-on ("DAROCUR 1116" manufactured by Merck), 2-hydroxy-2-methyl-1-phenylpropane-1-on ("IRGACURE 1173" manufactured by BASF), diethoxyacetophenone, and the like; benzoin compounds such as benzoin, benzoin methyl ether, benzoin ethyl ether, benzoin isopropyl ether, benzoin isobutyl ether, 2,2-dimethoxy-2-phenylacetophenone ("IRGACURE 651" manufactured by BASF), and the like; benzophenone compounds such as benzoylbenzoic acid, methyl benzoylbenzoate, 4-phenyl benzophenone, hydroxybenzophenone, 4-benzoyl-4'-methyldiphenylsulfide, 3,3'-dimethyl-4-methoxybenzophenone ("KAYACURE MBP" manufactured by Nippon Kayaku Co., Ltd.), and the like; and thioxanthone compounds such as thioxanthone, 2-clorothioxanthone ("KAYACURE CTX" manufactured by Nippon Kayaku Co., Ltd.), 2-methyl thioxanthone, 2,4-dimethyl thioxanthone ("KAYACURE RTX" manufactured by Nippon Kayaku Co., Ltd.), isopropylthioxanthone, 2,4-dichloro thioxanthone ("KAYACURE CTX" manufactured by Nippon Kayaku Co., Ltd.), 2,4-diethyl thioxanthone ("KAYACURE DETX" manufactured by Nippon Kayaku Co., Ltd.), 2,4-diisopropyl thioxanthone ("KAYACURE DITX" manufactured by Nippon Kayaku Co., Ltd.), and the like. As preferred compounds, there may be cited IRGACURE TPO, IRGACURE TPO-L, IRGACURE OXE01, IRGACURE OXE02, IRGACURE 1300, IRGACURE 184, IRGACURE 369, IRGACURE 379, IRGACURE 819, IRGACURE 127, IRGACURE 907, and IRGACURE 1173 (all manufactured by BASF), and especially IRGACURE TPO, IRGACURE TPO-L, IRGACURE OXE01, IRGACURE OXE02, IRGACURE 1300, or IRGACURE 907. These photopolymerization initiators can be used as a single type, in the form of several types mixed in any proportion.

In cases of using benzophenone compounds or thioxanthone compounds, it is possible for adjuvants to be used in order to promote the photopolymerization reaction. As such adjuvants there may be cited, for example, amine compounds such as triethanolamine, methyldiethanolamine, triisopropanolamine, n-butylamine, N-methyldiethanolamine, diethylaminoethyl methacrylate, Michler's ketone, 4,4'-diethylaminophenone, ethyl 4-dimethylaminobenzoate, (n-butoxy)ethyl 4-dimethylaminobenzoate, isoamyl 4-dimethylaminobenzoate, and the like.

The amounts in which the aforementioned photopolymerization initiators and adjuvants are added are preferably within a range in which the liquid crystal properties of the compositions employed in the present invention are not affected, these amounts preferably being 0.5 weight parts to 10 weight parts, and more preferably 2 weight parts to 8 weight parts, to 100 weight parts of the ultraviolet-curing compounds contained in the compositions employed in the present invention. For the adjuvants, amounts on the order of 0.5 to 2 times the amount of the photopolymerization initiator are acceptable.

One possible method for using the aforementioned cholesteric liquid crystals to prepare the light-reflecting layer employed in the present invention is, for example, to add a chiral agent to the nematic liquid crystal monomer having polymerizable groups, in an amount necessary to produce right-handedness or left-handedness such that the desired wavelength is reflected. Next, the materials are dissolved in a solvent, and a photopolymerization initiator is added. Next, the solution is applied to a plastic substrate such as a PET film in such a way as to produce as uniform a thickness as possible thereon, and while evaporating the solvent by heating, leaving the layer for a fixed time period under temperature conditions such that cholesteric liquid crystals become oriented to the desired helical pitch on the substrate. At this time, by carrying out an orientation process, such as rubbing or stretching, on the plastic film surface prior to application, the orientation of the cholesteric liquid crystals can be made uniform, and it is possible to reduce the haze value of the film. Next, while maintaining this oriented state, the film is irradiated with ultraviolet rays from a high-pressure mercury lamp or the like to bring about fixation of the orientation, and obtain a film having the light-reflecting layer employed in the present invention. Here, where a chiral agent that produces right-handedness has been selected, a light-reflecting layer R is obtained, and where a chiral agent that produces left-handedness has been selected, a light-reflecting layer L is obtained.

Because the reflection wavelengths of the light-reflecting layer have a reflection wavelength range, they are represented using a center reflection wavelength which is the center value of the reflection wavelength in question. The center reflection wavelength refers to the center wavelength of the reflection spectrum of the light-reflecting layer, and the value thereof is the middle value between wavelengths at the long-wavelength end, and at the short-wavelength end at which the transmittance in the reflection spectrum is 75%. For example, where the light-reflecting layer is measured by spectometry, in the event that the wavelength at the short-wavelength end at which transmittance in the reflection spectrum is 75% is 500 nm, and the wavelength at the long-wavelength end is 600 nm, the center reflection wavelength of the light-reflecting layer would be 550 nm. For sunglass applications, a visible light spectrum is preferred so as to give a metallic hue, and a center reflection wavelength of 400 nm-800 nm, more preferably 410-780 nm, and still more preferably 430-700 nm may be selected, as appropriate, depending on the desired hue. For example, in the case of a center reflection wavelength of 450, reflected light will be a metallic blue, in the case of 550, a metallic green, and in the case of 650, a metallic red.

It is preferable for the reflection wavelengths of the obtained light-reflecting layer R and the light-reflecting layer L to match, and in particular it is preferable for the difference of the center reflection wavelength, which is the center of the reflection wavelength spectrum, to be kept within 20 nm, more preferably within 10 nm, and still more preferably within 5 nm, between the light-reflecting layer R and the light-reflecting layers L. With difference exceeding 20 nm, for example, left-polarized light passing through the light-reflecting layer R is not reflected to a sufficient extent by the light-reflecting layer L, there is a large decline in polarization, and functionality as polarized sunglasses is depressed.

The film obtained in the present invention may be a combination of a plurality of light-reflecting layers R and light-reflecting layers L having different center reflection wavelengths. For example, where the Rx and Lx respectively denote a light-reflecting layer R and a light-reflecting layer L having a center reflection wavelength Xm, by laminating a combination of R450 and L450 and a combination of R650 and L650, simultaneous reflection near 450 nm and near 650 nm can be achieved. There are no particular limitations as to the combination, and complex, variegated reflection colors can be obtained.

While there are no particular limitations as to the means for laminating the light-reflecting layers employed in the present invention, lamination employing an adhesive or bonding agent is preferred. As adhesive agents, acrylic based and rubber based adhesives may be cited, with acrylic based adhesives being preferred for their adhesive properties and ease of adjustment of the holding power. As bonding agents, ultraviolet curing type resin compositions and thermal curing type resin compositions may be cited. In the case of ultraviolet curing type resin compositions, adhesion can be brought about by curing a composition which is a mix of several monomers having acryloyl groups or epoxy groups, through irradiation with ultraviolet in the presence of a photopolymerization initiator. In the case of thermal curing type resin compositions, adhesion can be brought about by thermal curing of a composition which is a mix of several monomers having epoxy groups in the presence of an acid catalyst. Alternatively, adhesion can be brought about by thermal curing of a composition comprising a polymer or several monomers having amino groups, carboxyl groups, or hydroxyl groups, in the presence of a compound having isocyanate groups or melamine.

Typically, a PVA polarization film may be cited as the polarization element employed in the present invention, but there are no particular limitations as to the method for preparing the film, which may be manufactured by inducing a polymer film of polyvinyl alcohol or a derivative thereof to adsorb iodine, a dichroic dye, or other pigment, and orienting the film by uniaxial stretching. From the standpoint of heat resistance, the pigment is preferably a dichroic dye, particularly a direct dye comprising an azo pigment having sulfonic acid groups.

The optical film of the present invention can be obtained by laminating a polarization element and a laminate having a light-reflecting layer obtained in the above manner. While there are no particular limitations as to the method for laminating the polarization element and the laminate having a light-reflecting layer, it is preferable to bond these together via a bonding agent layer from which high adhesive strength is obtained. It is possible for either a hot-melt bonding agent or a curable bonding agent to be used for the bonding agent layer. Normally, as curable bonding agents, there can be used acrylic resin based materials, urethane resin based materials, polyester resin based materials, melamine resin based materials, epoxy resin based materials, silicone based materials, and the like; from the standpoint of their excellent adhesive strength and workability during bending processes, two-pack type thermal curable urethane resins comprising a polyurethane polymer which is a urethane resin based material, and a curing agent, are preferred.

A bonding agent into which a dimming dye has been dissolved may be employed as the bonding agent for bonding the polarization element and the laminate having a light-reflecting layer.

The optical laminate of the present invention can be obtained by sandwiching an optical film obtained in this manner, between supports. FIG. 1 illustrates an example of a configuration diagram of the present invention. A laminate 3 obtained by laminating a light-reflecting layer 1 and a light-reflecting layer 2 using an adhesive or bonding agent 4 is likewise laminated to a polarization element 5, whereby an optical film 6 according to the present invention can be obtained. The optical film 6 can then be sandwiched between supports 7 to obtain an optical laminate 8 of the present invention. The method used for laminating the optical laminate is not limited to one involving lamination of a support to the optical film, and it would be acceptable to employ other lamination methods, such as one involving successive lamination in which the laminate 3 obtained by laminating the light-reflecting layer 1 and the light-reflecting layer 2 using an adhesive or the bonding agent 4 is laminated to one of the supports 7, and the polarization element 5 is then laminated to the other support 7; one involving laminating a support 7 to a laminate 3 obtained by laminating the light-reflecting layer 1 and the light-reflecting layer 2 using an adhesive or the bonding agent 4, and then laminating this to a separate laminate of the polarization element 5 and a support 7, or the like.

For the supports, resins such as polycarbonate, polyamide, triacetyl cellulose (TAC), and the like can be used. For sunglasses or goggles of which impact resistance or heat resistance will be required, it is preferable to use a polycarbonate for the support, among which an aromatic polycarbonate comprising bisphenol A is especially preferred.

The total light transmittance of the support is preferably 70% or greater, more preferably 80% or greater, and still more preferably 85% or greater in order to ensure visibility.

In instances in which the optimum working temperature of the aforementioned polarized films will be low, it is preferable to select, for example, an aromatic polycarbonate/PCC composition (wholly alicyclic polyester composition), or a polyamide with a glass transition temperature of 130° C. or lower.

There are no particular limitations as to the sandwiching method, but sandwiching via bonding agent layers is preferred in order to obtain high adhesive strength. It is possible for either a hot-melt bonding agent or a curable bonding agent to be used for the bonding agent layer. Normally, as curable bonding agents, there can be used acrylic resin based materials, urethane resin based materials, polyester resin based materials, melamine resin based materials, epoxy resin based materials, silicone based materials, and the like; from the standpoint of their excellent adhesive strength and workability during bending processes, two-pack type thermal curable urethane resins comprising a polyurethane polymer which is a urethane resin based material, and a curing agent, are preferred.

Using the optical laminate of the present invention obtained in this manner, forming the laminate to the desired shape so that the laminate of the light-reflecting layer is facing outward, and affixing the laminate within a frame, sunglasses, goggles, or a helmet visor according to the present invention can be obtained.

For example, in the case of sunglasses, the optical laminate is punched out to the desired shape, and then subjected to a bending process. There are no particular limitations as to the bending method, and processing may take place via steps for imparting a spherical shape or non-spherical shape, according to the intended purpose. Optionally, a resin may be injected into the bending-processed product. In this case, there is an advantage as well that thickness irregularities in the optical laminate become less apparent to the eye, whence the laminate may be used in products which are of particularly top caliber as to the qualities of impact resistance and exterior appearance, and yet which strain not the eye, even where the lens lacks focal point refractive power. In order to prevent deterioration in appearance caused by a refractive index differential, it is preferable for the layer contacting the injected resin to be the same material as the resin being injected.

Sunglasses may be made by forming a hard coat, antireflective film, or the like on the surface, and then subjecting the product lens edging, hole boring, and attachment to a frame using screws or the like.

EXAMPLES

The present invention shall be exemplified hereinbelow through working examples. In the working examples, "parts" refers to parts by weight.

Preparation of Coating Liquids (Liquid Crystal Composition)

Coating liquids (R1) and (L1) of the formulations indicated in the table below were prepared.

TABLE 1

Table showing composition of coating liquid (R1)

| Material (type) | Material name (mfr.) | Amount in formulation |
|---|---|---|
| Polymerizable liquid crystal monomer | LC242 (BASF) | 20.00 |
| Chiral agent | LC756 (BASF) | 1.54 |
| Polymerization initiator | Irgacure TPO (BASF) | 1.00 |
| Solvent | cyclopentanone | 80.00 |

TABLE 2

Table showing composition of coating liquid (L1)

| Material (type) | Material name (mfr.) | Amount in formulation |
|---|---|---|
| Polymerizable liquid crystal monomer | LC242 (BASF) | 20.00 |
| Chiral agent | compound 1 indicated below | 4.32 |
| Polymerization initiator | Irgacure TPO (BASF) | 1.00 |
| Solvent | cyclopentanone | 80.00 |

Next, coating liquids (R2), (R3), (R4), and (R5) were prepared by formulation in the same manner as for coating liquid (R1), except for changing the amounts of the chiral agent formulation to those amounts shown in the table below.

TABLE 3

| Coating liquid | Chiral agent formulation amount |
|---|---|
| Coating liquid (R2) | 1.26 |
| Coating liquid (R3) | 1.04 |
| Coating liquid (R4) | 1.32 |
| Coating liquid (R5) | 1.37 |

Also, coating liquids (L2), (L3), and (L4) were prepared by formulation in the same manner as for coating liquid (L1), except for changing the formulation amounts of the chiral agent to those amounts shown in the table below.

TABLE 4

| Coating liquid | Chiral agent formulation amount |
|---|---|
| Coating liquid (L2) | 3.48 |
| Coating liquid (L3) | 2.79 |
| Coating liquid (L4) | 3.36 |

Chiral agent: compound 1 (compound disclosed in Japanese Laid-Open Patent Application 2002-179668)

[Formula 1]

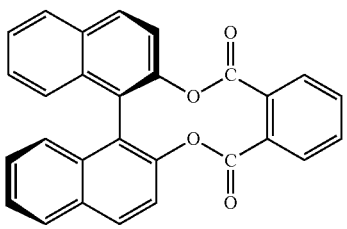

Example 1

<Preparation of Light-Reflecting Layer>

Using the prepared coating liquids (R1) and (L1), each of the light-reflecting layers was prepared by the procedure indicated below, and these were then laminated to prepare laminates having the light-reflecting layers employed in the present invention. PET film (no undercoat layer) manufactured by Toyobo Co. Ltd. was used as a plastic substrate.

(1) Using a wire bar, each coating liquid was applied at room temperature to the PET film, to a post-drying film thickness of 4 µm.

(2) Product was heated for 5 minutes at 150° C. to eliminate the solvent and produce a cholesteric liquid crystal phase. Next, product was irradiated with UV for 5-10 seconds at 120 W output from a high-pressure mercury lamp (manufactured by Harison Toshiba Lighting Corp.), and the cholesteric liquid crystal phase was fixed, to obtain the light-reflecting layer.

(3) The light-reflecting layers (R1) and light-reflecting layers (L1) prepared in steps (1) and (2) were laminated together from the light-reflecting layer side, using an acrylic based adhesive.

(4) The PET films on either surface were peeled away.

Laminates having the light-reflecting layers employed in the present invention, comprising two layers, i.e., the laminated light-reflecting layer (R1) and the light-reflecting layer (L1), were thus obtained. The center reflection wavelengths of the laminated light-reflecting layer (R1) and the light-reflecting layer (L1) were 450 nm and 455 nm, respectively.

<Fabrication of Polarizing Elements>

Polyvinyl alcohol (manufactured by Kuraray Co. Ltd., trade name KURARAY VINILON #750) was dyed for 3 minutes at 35° C. in an aqueous solution containing 0.25 g/L of chlorantine fast red (C.I. 28160), 0.18 g/L of chrysophenine (C.I. 24895), 1.0 g/L of solophenyl blue 4GL (C.I. 34200), and 10 g/L of sodium sulfate, the stretched 4-fold in solution. Next, this dyed sheet was immersed for 3 minutes at 35° C. in an aqueous solution containing 2.5 g/L of nickel acetate and 6.6 g/L of boric acid. Next, the sheet, while held in a tensioned state, was dried for 3 minutes at room temperature, then heat treated for 3 minutes at 70° C., to obtain polarizing elements. Using a spectrophotometer, the polarizing elements were measured as to polarization by an absolute polarization method; the result was polarization of 99.5%.

<Fabrication of Optical Film>

Next, the aforedescribed light-reflecting layer laminates and the polarizing elements were bonded together with a urethane resin based bonding agent, to obtain optical films of the present invention. Using a spectrophotometer, the optical films were measured as to polarization by an absolute polarization method; the result was polarization of 98.0%.

<Fabrication of Optical Laminate>

Using a urethane resin based bonding agent, a bisphenol A type aromatic polycarbonate (manufactured by Mitsubishi Gas Chemical Co. Ltd.) 0.3 mm thick was bonded to either side of the optical films to prepare optical laminates.

<Fabrication of Polarized Sunglasses>

By way of a basic shape, the optical laminates were punched into strip shapes of circles 79.5 mm in diameter, cut to a width of 55 mm in the vertical direction, and subjected to a bending process using a die having a base curve of 7.95 (curvature ratio 66.67 mm). The bent optical laminates were inserted into a die for injection molding, and molten polycarbonate was injection-molded into the concave surface, to obtain polarized lenses. Next, lens edging to match the frame was carried out, and the polarized lenses were fitted into the frame to prepare polarized sunglasses.

Example 2

A laminate of the light-reflecting layers employed in present invention were prepared by the same operation as in Example 1, except for using the prepared coating liquids (R2) and (L2). The center reflection wavelength of the light-reflecting layer (R2) and the light-reflecting layer (L2) was 540 nm. Next, the laminate was laminated to a polarizing element in the same way as in Example 1, to obtain an optical film of the present invention. The optical film was measured as to polarization in the same manner as in Example 1; the result was polarization of 98.1%.

Example 3

A laminate of the light-reflecting layers employed in present invention were prepared by the same operation as in Example 1, except for using the prepared coating liquids (R3) and (L3). The center reflection wavelengths of the light-reflecting layer (R3) and the light-reflecting layer (L3) were 650 nm and 630 nm, respectively. Next, the laminate was laminated to a polarizing element in the same way as in Example 1, to obtain an optical film of the present invention. The optical film was measured as to polarization in the same manner as in Example 1; the result was polarization of 98.3%.

Example 4

A laminate of the light-reflecting layers employed in present invention was prepared by the same operation as in Example 1, except for using the prepared coating liquids (R4) and (L2). The center reflection wavelengths of the light-reflecting layer (R4) and the light-reflecting layer (L2) were 520 nm and 540 nm, respectively. Next, the laminate was laminated to a polarizing element in the same way as in Example 1, to obtain an optical film of the present invention. The optical film was measured as to polarization in the same manner as in Example 1; the result was polarization of 92.9%.

Example 5

Light-reflecting layers were prepared by the same operation as in Example 1, except for using the prepared coating liquids (R1), (L1), (R3), and (L3), then laminates of the light-reflecting layer (R1) and the light-reflecting layer (L1), and the light-reflecting layer (R3) and the light-reflecting layer (L3), respectively, were obtained by the same operation as in Example 1. The two laminates were laminated using an acrylic based adhesive to obtain a laminate of the light-reflecting layers employed in the present invention. The center reflection wavelengths of the light-reflecting layer (R1) and the light-reflecting layer (L1) were 450 nm and 455 nm, respectively; the center reflection wavelengths of the light-reflecting layer (R3) and the light-reflecting layer (L3) were 650 nm and 630 nm, respectively. Next, the laminate was laminated to a polarizing element in the same way as in Example 1, to obtain an optical film of the present invention. The optical film was measured as to polarization in the same manner as in Example 1; the result was polarization of 97.5%.

Example 6

A laminate of the light-reflecting layers employed in present invention was prepared by the same operation as in Example 1, except for using the prepared coating liquids (R5) and (L2). The center reflection wavelengths of the light-reflecting layer (R5) and the light-reflecting layer (L2) were 500 nm and 540 nm, respectively. Next, the laminate was laminated to a polarizing element in the same way as in Example 1, to obtain an optical film for comparison. The optical film was measured as to polarization in the same manner as in Example 1; the result was polarization of 84.2%.

Comparative Example 1

Using the prepared coating liquid (R2) only, light-reflecting layers were prepared by the same operation as in Example 1. The center reflection wavelength of the light-reflecting layers (R2) was 540 nm. Next, the layer was laminated to a polarizing element in the same way as in Example 1, to obtain an optical film for comparison. The optical film was measured as to polarization in the same manner as in Example 1; the result was polarization of 67.7%.

Comparative Example 2

Using the prepared coating liquid (L4) only, light-reflecting layers were prepared by the same operation as in Example 1. The center reflection wavelength of the light-reflecting layers (L4) was 555 nm. Next, the layer was laminated to a polarizing element in the same way as in Example 1, to obtain an optical film for comparison. The optical film was measured as to polarization in the same manner as in Example 1; the result was polarization of 69.7%.

When the Examples and the Comparative Examples are compared as above, from Examples 1-6, it may be appreciated that by laminating a right-handed helical oriented cholesteric liquid crystal layer and a left-handed helical oriented cholesteric liquid crystal layer, the polarization is greatly improved, as compared with a right-handed helical oriented cholesteric liquid crystal layer only as in Comparative Example 1, or a left-handed helical oriented cholesteric liquid crystal layer only as in Comparative Example 2. Moreover, in Examples 1-5, due to the small difference of the center reflection wavelength, i.e., 20 nm or less, between the right-handed helical oriented cholesteric liquid crystal layer and the left-handed helical oriented cholesteric liquid crystal layer, high polarization can be maintained, as compared with Example 6.

INDUSTRIAL APPLICABILITY

By employing the optical laminate of the present invention, there can be provided polarized sunglasses, goggles, or a helmet visor unaffected by the extrinsic degrading factors of sebum, moisture, or salt air, and therefore having excellent polarization capabilities, while also imparting a metallic hue.

KEY TO SYMBOLS

1 Light-reflecting layer R
2 Light-reflecting layer L
3 Laminate employed in the present invention
4 Adhesive agent or bonding agent
5 Polarizing element
6 Optical film of present invention
7 Support
8 Optical laminate of present invention

The invention claimed is:
1. An optical film, comprising:
a light-reflecting layer R comprising a cholesteric liquid crystal layer having a right-handed helical orientation,
a light-reflecting layer L comprising a cholesteric liquid crystal layer having a left-handed helical orientation, and
a polarizing element layer, wherein the polarizing element layer is adhered or bonded to a film comprising the light-reflecting layer R and the light-reflecting layer L,
wherein the difference of the center reflection wavelength between the light-reflecting layer R and the light-reflecting layer L is within 20 nm.
2. The optical film according to claim 1, wherein the light-reflecting layer R is obtained by fixing the cholesteric crystal layer having a right-handed helical orientation and that the light-reflecting layer L is obtained by fixing the cholesteric crystal layer having a left-handed helical orientation.
3. The optical film according to claim 1, wherein the center reflection wavelengths of the light-reflecting layer R and the light-reflecting layer L are 400 nm-800 nm.
4. The optical film according to claim 1, wherein the polarizing element comprises a stretched polymer film containing a dichroic pigment.
5. Eyewear comprising the optical film according to claim 1.
6. Eyewear according to claim 5, wherein the eyewear is sunglasses, goggles, or a helmet visor.
7. An optical laminate, comprising a light-reflecting layer R comprising a cholesteric liquid crystal layer having a right-handed helical orientation, a light-reflecting layer L comprising a cholesteric liquid crystal layer having a left-handed helical orientation, and a polarizing element layer provided between a first support and a second support,
wherein the polarizing element layer is adhered or bonded to a film comprising the light-reflecting layer R and the light-reflecting layer L,
wherein the difference of the center reflection wavelength between the light-reflecting layer R and the light-reflecting layer L is within 20 nm.
8. The optical laminate according to claim 7, wherein the light-reflecting layer R is obtained by fixing the cholesteric liquid crystal layer having a right-handed helical orientation and that the light-reflecting layer L is obtained by fixing the cholesteric crystal layer having a left-handed helical orientation.
9. The optical laminate according to claim 7, wherein the center reflection wavelengths of the light-reflecting layer R and the light-reflecting layer L are 400 nm-800 nm.

10. The optical laminate according to claim 7, wherein the polarizing element comprises a stretched polymer film containing a dichroic pigment.

11. The optical laminate according to claim 7, wherein the supports are polycarbonate.

12. Eyewear comprising the optical laminate according to claim 7.

13. Eyewear according to claim 12, wherein the eyewear is sunglasses, goggles, or a helmet visor.

* * * * *